United States Patent [19]
Radliff et al.

[11] Patent Number: 5,530,786
[45] Date of Patent: Jun. 25, 1996

[54] HOLDING FOR OPTICAL FIBER SPLICE COUPLINGS

[75] Inventors: David R. Radliff; Scott A. Keener; Robert E. Stough, all of Harrisburg, Pa.

[73] Assignee: The Whitaker Corporation, Wilmington, Del.

[21] Appl. No.: 453,739

[22] Filed: May 30, 1995

[51] Int. Cl.$^6$ .................................................. G02B 6/00
[52] U.S. Cl. ........................................... 385/136; 385/147
[58] Field of Search .............................. 385/96–99, 100, 385/135, 136, 147

[56] References Cited

U.S. PATENT DOCUMENTS

| | | | |
|---|---|---|---|
| 3,768,146 | 10/1973 | Braun et al. | 385/99 X |
| 4,627,686 | 12/1986 | Szentesi | 385/135 |
| 4,687,289 | 8/1987 | DeSanti | 350/96.20 |
| 4,702,551 | 10/1987 | Coulombe | 350/96.20 |
| 4,793,681 | 12/1988 | Barlow et al. | 385/135 |
| 4,840,449 | 6/1989 | Gnandeharizadeh | 350/96.20 |
| 4,842,362 | 6/1989 | Anderton | 385/135 |
| 4,854,661 | 8/1989 | Cooper et al. | 385/99 |
| 4,911,521 | 3/1990 | Ryuto et al. | 350/96.20 |
| 5,046,811 | 9/1991 | Jung et al. | 385/15 |
| 5,069,523 | 12/1991 | Finzel et al. | 385/135 |
| 5,071,211 | 12/1991 | DeBortoli et al. | 385/135 X |
| 5,222,184 | 6/1993 | Foss | 385/135 |
| 5,278,933 | 1/1994 | Hunsinger et al. | 385/135 |
| 5,323,480 | 6/1994 | Mullaney et al. | 385/135 |
| 5,375,185 | 12/1994 | Hermsen et al. | 385/135 |
| 5,416,882 | 5/1995 | Hakoun et al. | 385/136 |
| 5,420,956 | 5/1995 | Grugel et al. | 385/135 |
| 5,422,974 | 6/1995 | Brown et al. | 385/135 |

OTHER PUBLICATIONS

Siecor Catalog, "Splice Trays", pp. 2–65 to 2–68; Siecor Corporation, Hickory, North Carolina (No Date).
AMP Instruction Sheet 408–9490, "AMP Organizer Holder Kits and Trays", five pages; Mar. 1993; AMP Incorporated, Harrisburg, PA.
DSM Brochure, "SARLINK 3000 Thermoplastic Elastomers", three pages, Nov., 1994; DSM Thermoplastic Elastomers, Inc., Leominster, MA.
BEJED Drawing, "BJ–1742C–005 12 Fiber Universal Splice Unit"; Feb., 1994; BEJED Communication Products, Portland, OR.
Fitel Brochure, "Optical Fiber Fusion Splicer S198A", four pages; JDS Fitel Inc., Ottawa, Canada (No Date).
AMP Catalog 82188, "AMP Fiber Optic Products", p. 147; Feb. 1993; AMP Incorporated, Harrisburg, PA.

Primary Examiner—Akm E. Ullah
Attorney, Agent, or Firm—Anton P. Ness

[57] ABSTRACT

A splice holder (24) having first channels (70) having upper and lower portions (80,82) separated by a constriction (76) with each portion adapted to hold a respective single-fiber splice coupling (84). Second channels (90) have a large diameter adapted to hold a multi-fiber mass fusion splice coupling (94) used with ribbon cable. Both the first and second channels (70,90) having constrictions along their entrances of less width than a splice coupling (84,94) to be inserted thereinto. Splice holder (24) may be adhered to a bottom wall (14) of a splice tray (10).

12 Claims, 4 Drawing Sheets

HOLDING FOR OPTICAL FIBER SPLICE COUPLINGS

FIELD OF THE INVENTION

The present invention relates to the field of optical fiber interconnection and more particularly to holders for fiber-to-fiber splice connections.

BACKGROUND OF THE INVENTION

In multiple fiber interconnection arrangements, a plurality of pairs of associated optical fibers are to be interconnected and such interconnections must thereafter be held securely and carefully, usually in an organizer tray or cassette within a larger enclosure or cabinet, and usually in an array of such trays or cassettes. Such trays must also hold generous portions of the fibers adjacent the interconnections, or splices, to permit splice repair without requiring cable replacement. Preferably the trays or cassettes also provide for securing jacketed portions of the cables containing one or more of the optical fibers, at ends of the trays. The splice connections comprise fusion of the ends or end lengths of the associated optical fibers, or adhesive bonding, or precision clamping, and the thus-fused fiber ends are preferably maintained within a protective sleeve or adapter to maintain the precision alignment of the fibers and provide a level of physical protection and strain relief to the splice coupling.

It is desired to provide a holder for the array of splice connections of a plurality of pairs of associated fibers.

SUMMARY OF THE INVENTION

The present invention comprises a member of resilient material for holding splice couplings of fiber optic members such as single fibers or of multi-fiber ribbon cable. An array of first channels extend from a first end to an opposed second end. Each first channel has a general width about equal to the diameter of a single-fiber splice coupling, and a depth equal to twice the diameter of a single-fiber splice coupling; each first channel has a first constriction at its entrance along the top surface and a second constriction midway to the channel bottom, thus defining upper and lower positions for each first channel to hold a pair of single-fiber splice couplings within its upper and lower portions. Several second channels are optionally provided that have a large diameter sufficient to contain multi-fiber or mass fusion splice couplings of ribbon cable, with a constriction at the channel entrance along the top surface to hold the mass fusion splice coupling therein. Being made of elastomeric material enables the holder to hold each splice coupling in a respective channel under a modest level of compression.

In a second embodiment, a splice holder has a splice holding central portion, a flat base section extending from opposed ends of the central portion, and strain relief portions spaced from the central portion having an array of narrow width slots into which are fitted single fibers and ribbon cable extending from splice couplings disposed in the splice holding central portion, relieving the splice couplings from stress by maintaining the fibers and ribbon cable straight as they extend from ends of the splice couplings for a fixed distance.

It is an objective of the present invention to provide a splice holder suitable for holding splices of fiber optic members.

It is another objective to provide a splice holder for single-fiber fusion splice couplings and for multiple-fiber or mass fusion splice couplings.

It is still further an objective to provide a splice holder member that facilitates quick and simple initial placement of splice couplings thereinto.

It is yet another objective to provide such a strain relief member that easily enables removal and replacement of previously held splice couplings.

It is another objective to provide a splice holder that is of one piece.

An additional advantage of the splice holder member of the present invention is that the member may be extruded.

An embodiment of the present invention will now be described by way of example with reference to the accompanying drawings.

DETAILED DESCRIPTION OF THE PREFERRED EMBODIMENT

Figure 1:
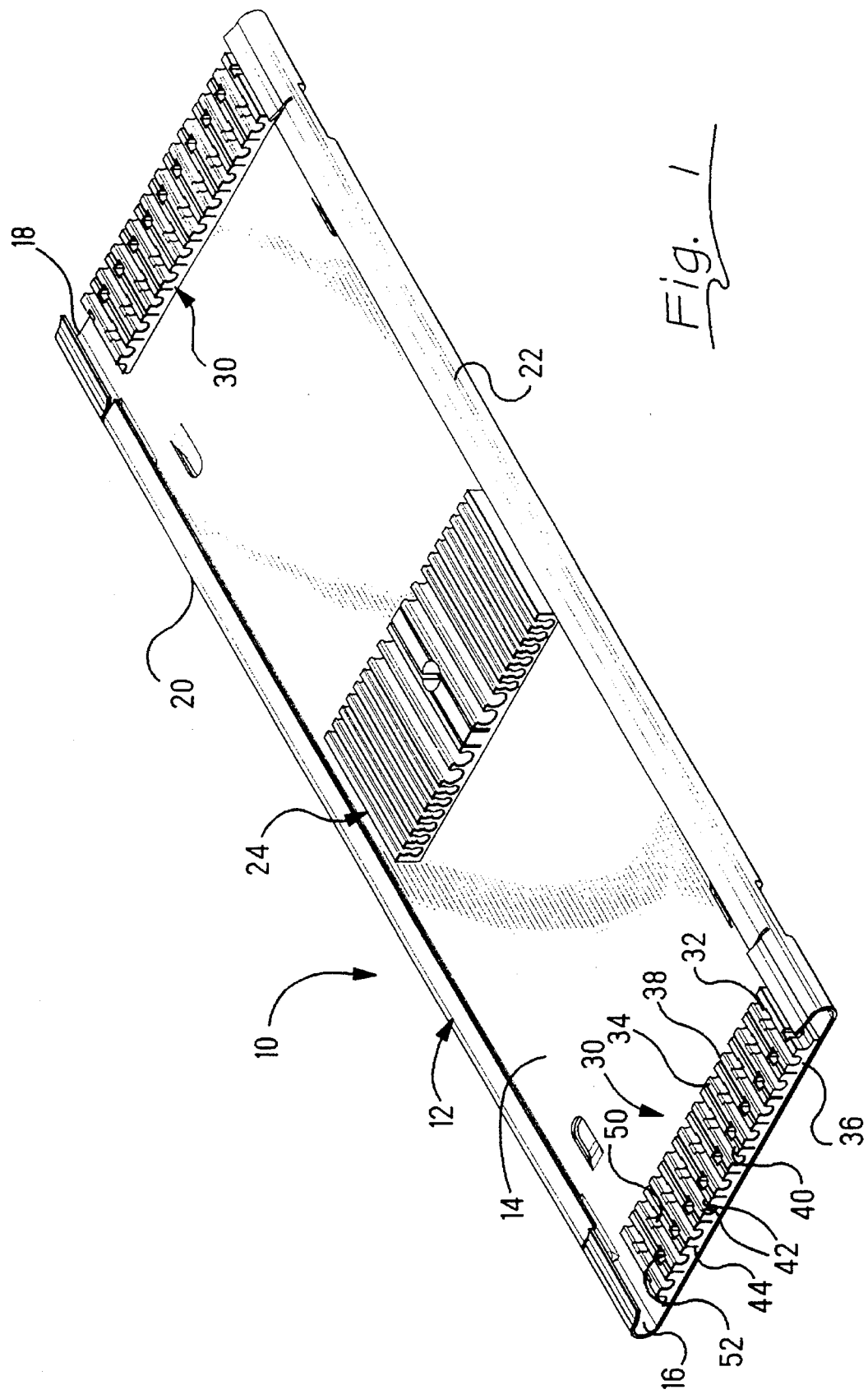
FIG. 1 is an isometric view of a splice tray having cable strain relief members at ends thereof and a splice holder of the present invention centrally disposed therebetween.

A splice tray or organizer 10 includes a tray body 12 having a bottom wall 14, opposed ends 16,18 and opposed side walls 20,22, as well as a preferably transparent cover member (not shown) that is securable to tray body 12. A splice holder 24 of the present invention is affixed to bottom wall 14 centrally positioned between ends 16,18. Cable strain relief assemblies 30 are affixed to tray member 12 at respective ends 16,18 such as by fasteners or by use of adhesive or double-sided tape. Tray 10 provides substantial fiber-holding space between the ends for generous loops of discrete fibers like fiber 26 and ribbon cable 28 (FIG. 2) to be disposed therein that are preferably covered by the protective lid or cover member placed thereover and affixed to tray body 12.

Cable strain relief members 30 may be as disclosed in U.S. patent application Ser. No. 08/453,303 filed May 30, 1995 (concurrently herewith) U.S. patent application Ser. No. 08/453,157 filed May 30, 1995 (concurrently herewith) and assigned to the assignee hereof. Strain relief member 30 is shown to include a plurality of generally parallel elongate channels 32 formed into and along top surface 34 extending between first and second ends 36,38, with elongate protrusions 40 positioned between adjacent channels 32. Channels 32 are dimensioned to receive thereinto, if desired, jacketed portions of fibers 26 that have for example diameters of 3 mm, and each is undercut to form retention ledges 42 near top surface 34 defining therebetween a constriction less wide than the cable that will hold a jacketed cable 26 in position once inserted.

Each protrusion 40 preferably has a narrow slot 44 formed thereinto from top surface 34, with narrow slot 44 being dimensioned to approximately equal the thickness of a ribbon cable to receive a ribbon cable 28 thereinto. Narrow slot 44 is also of appropriate width to receive thereinto a buffered portion of a single fiber after being broken out from the jacket of a cable, if desired. Preferably the entrance to each slot 44 includes chamfers defining a lead-in facilitating insertion of a ribbon cable thereinto. Slots 44 also can assist in insertion of jacketed cables into channels 32 by allowing upper portions of protrusions 40 to be flexed outwardly when a cable is urged into the slightly narrower entrance to a channel 32 above retention ledges 42.

Strain relief holder 30 may also be provided with cable tie apertures 50,52 that are formed to be aligned with corresponding apertures (not shown) in the bottom wall 14 of splice tray 10, permitting mounting of conventional cable ties to the splice tray to supplement the strain relief characteristics of the strain relief holder, if desired. Cable tie apertures 50 are shown intersecting each channel 32 and are to be used when holder 30 is to be used with ribbon cable that utilizes slots 44, while cable tie apertures 52 are shown intersecting slots 44 that are to be used when holder 30 is to be used with jacketed single fiber cable.

Figure 2:
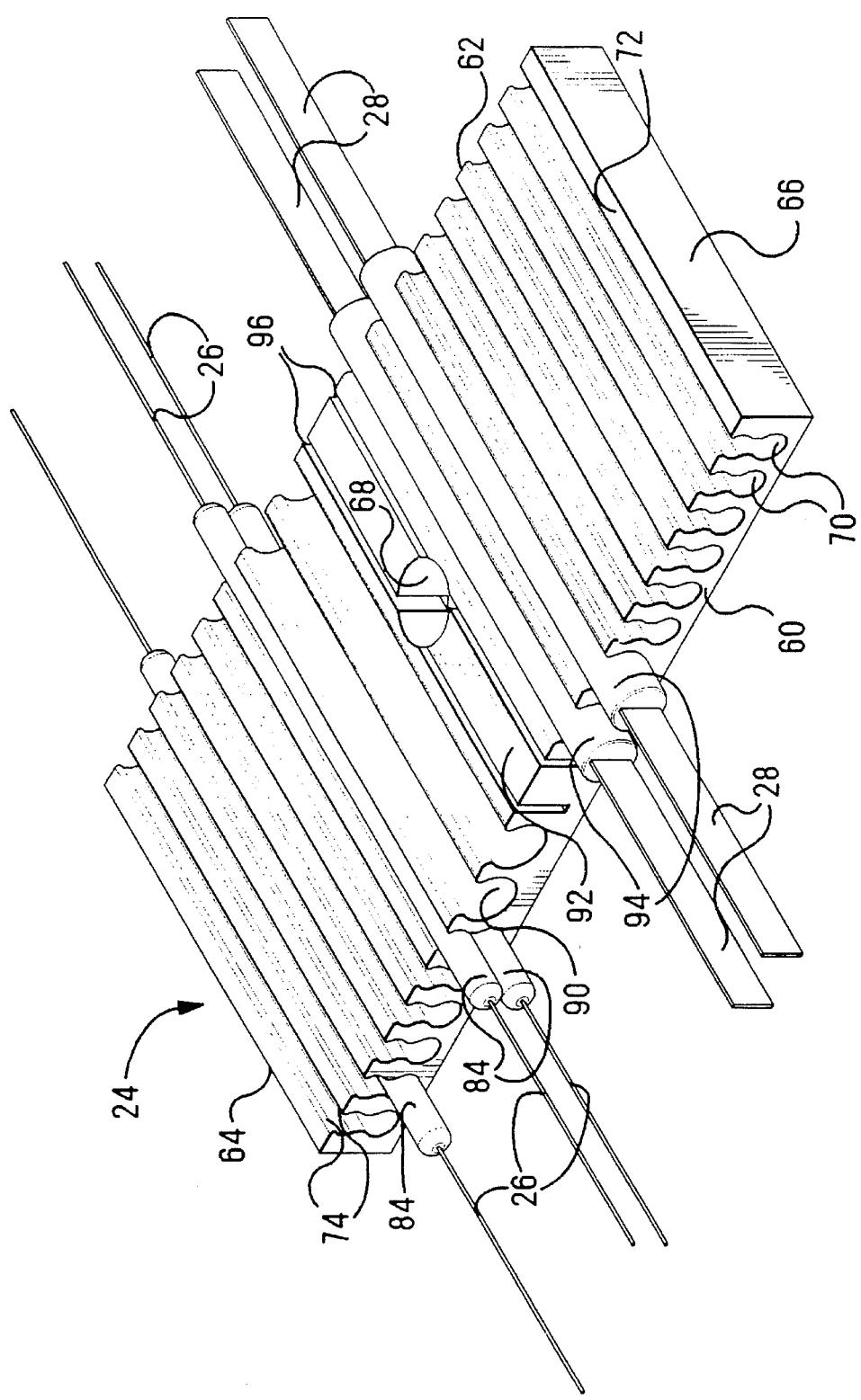
FIG. 2 is an isometric view of the splice holder of FIG. 1, with representative single-fiber splices and representative ribbon cable splices held therein.
Figure 3:
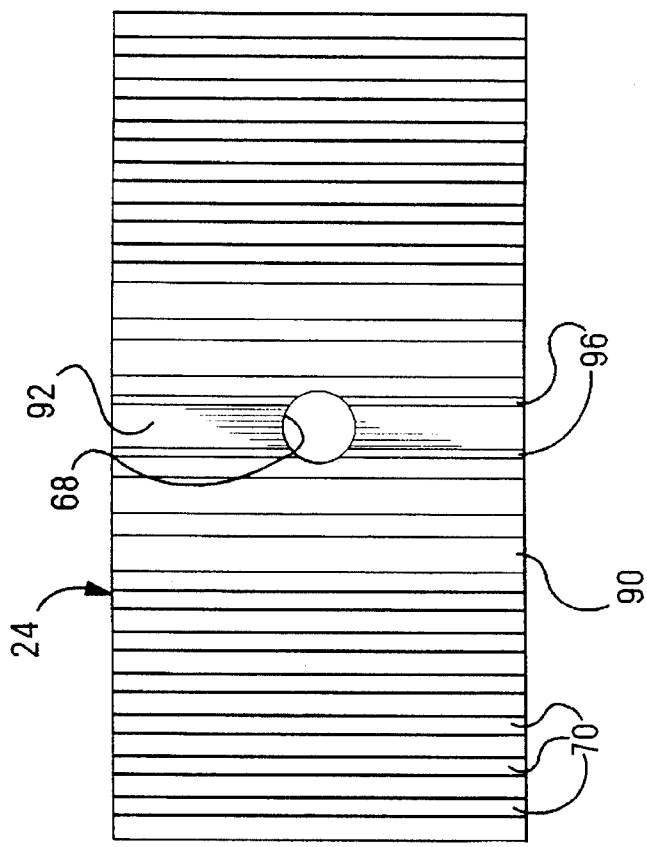
FIGS. 3 and 4 are plan and elevation views of the splice holder.
Figure 4:
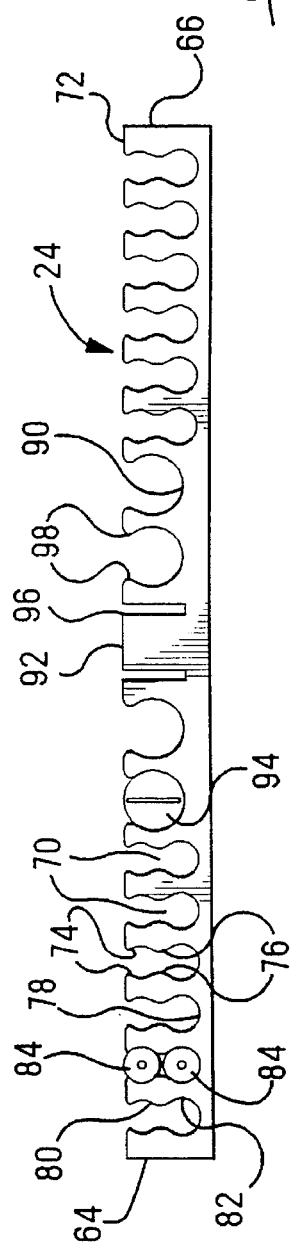

FIGS. 2 to 4 illustrate a first embodiment of the splice holder 24 of the present invention, a generally thick planar member of elastomeric material having opposed ends 60,62 and opposed side edges 64,66 dimensioned to be placed into splice tray 10 between side walls 20,22 and centrally disposed between tray ends (FIG. 1). Splice holder 24 may be easily mounted onto bottom wall 14 of splice tray 10 such as by adhesive or cement, or fasteners, or double sided tape and also peelable transfer paper. A centrally located aperture 68 is utilized to permit receipt of a vertical rod therethrough for stacking of several splice trays.

An array of first channels 70 is defined into top surface 72 of holder 24 shown in two regions adjacent side edges 64,66. Several second channels 90 are shown between the two first channel regions and the central region 92 containing aperture 68. Each second channel 90 is generally cylindrical, having a depth and diameter equivalent to the outer diameter of a multi-fiber mass fusion splice coupling 94 such as is used with ribbon cable 28. Mass fusion splice couplings very similar to coupling 94 may also be used with a plurality of discrete buffered fibers not in ribbon cable form, but that are preferably bonded to each other adjacent and outwardly from the ends of the mass fusion coupling. A constriction 98 is defined at the entrance along top surface 72 to hold mass fusion splice coupling 94 therein upon insertion thereinto and therealong. Such fusion splice couplings may be formed such as by use of fiber holders applied by a FITEL Optical Fiber Fusion Splicer S198A manufactured by Furukawa Electric and sold by JTS FITEL Inc. of Ottawa, Canada.

Each first channel 70 has a first constriction 74 defined at the entrance along top surface 72, and each first channel 70 is shown to include a second constriction 76 midway to channel bottom 78 to create upper and lower portions 80,82 each having a general dimension about equal to the diameter of a single-fiber fusion splice coupling 84 used with single fibers 26. Thereby, each first channel 70 can receive and hold two single-fiber splice couplings 84 therein, economizing on space to increase the density of splice couplings on the splice tray.

A pair of narrow width slots 96 are shown adjacent central aperture 68 in central region 92, that are used for providing deflectability of the inside walls of the large channels 90 adjacent central region 92. Each splice holder 24 may be made for example of elastomeric material such as SARLINK polypropylene based elastomer, Part No. 3170 or 3160 or 9760 all sold by DSM Thermoplastic Elastomers Inc., Leominster, Mass., and may be extruded rather than individually molded since holder 24 generally has a continuous cross-section therealong, with central aperture 68 being formable by a simple secondary operation.

Figure 5:
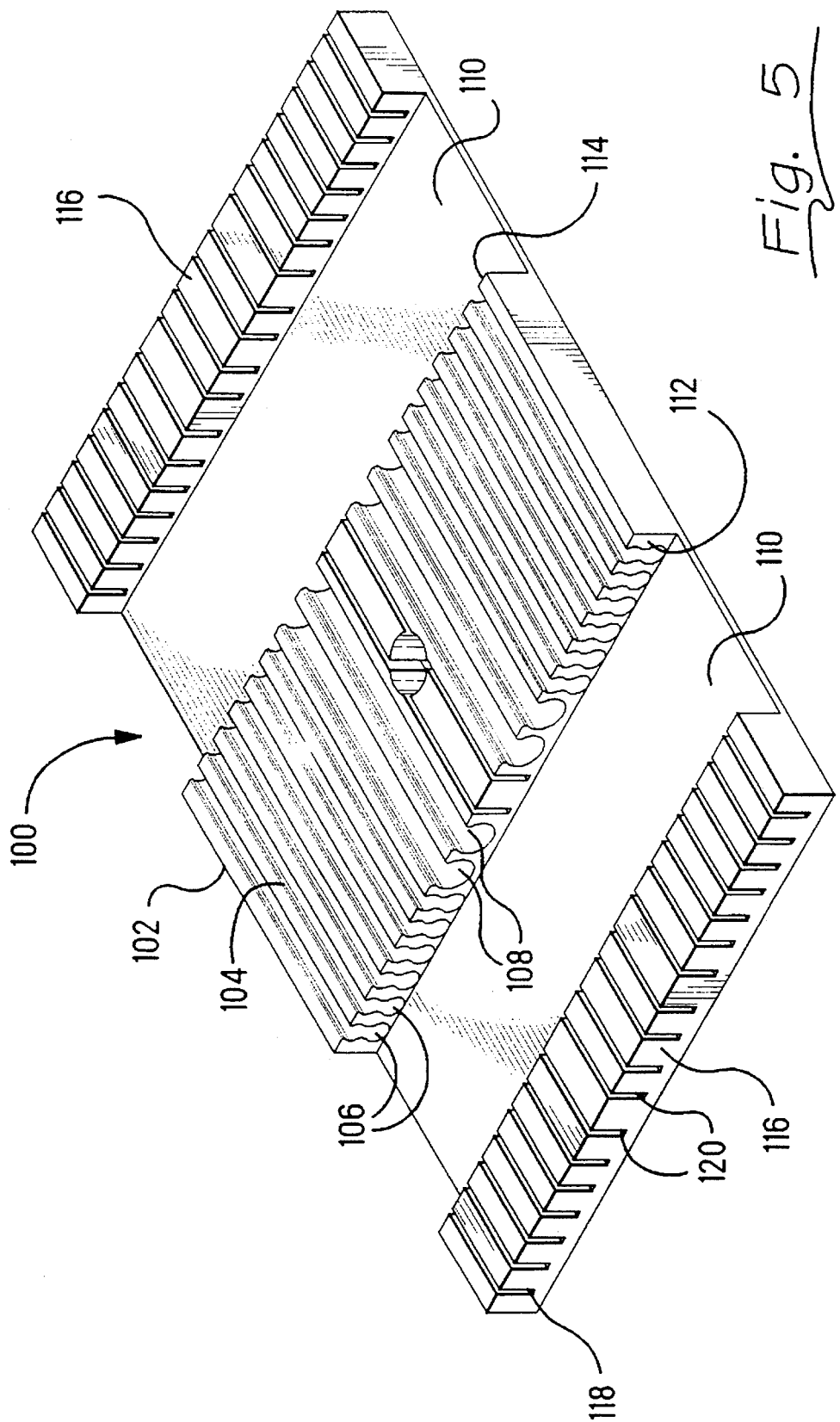
FIG. 5 is an isometric view of an alternate embodiment of the splice holder of the present invention.

FIG. 5 illustrates a second embodiment of the present invention of splice holder 100. A central splice holding portion 102 is shown to have a top surface 104 having formed thereinto generally first channels 106 for single-fiber splice couplings, and second channels 108 for mass fusion splice couplings and may be identical to first and second channels 70,90 of splice holder 24 as shown in FIGS. 1 to 4. A thin, flat base portion 110 extends from opposed first and second splice holding ends 112,114 to strain relief regions 116 spaced from first and second ends 112,114. Each strain relief region 116 includes an array of narrow width slots 118,120 extending into top surface 104 and aligned with first channels 106 and second channels 108 respectively. The width of each slot 118 is equivalent to the diameter of a single buffered fiber, and the width of each slot 120 is equivalent to the thickness of ribbon cable 28. Strain relief region 116 thus at least holds a portion of each fiber and ribbon cable at a selected distance from the splice holding central portion 102 and thus serves to isolate the splice couplings from stress resulting from different lateral directions assumed by the portions of the fibers and cables extending from the splice holder.

The splice holder of the present invention may be utilized independently of a splice tray if desired by simply being secured to a selected surface in a desired orientation to receive and hold fiber optic couplings such as of discrete or single fiber optic cable or of ribbon cable. Variations and modifications may occur to others that are within the spirit of the invention and the scope of the claims.

What is claimed is:

1. A splice holder for holding splice couplings of fiber optic members, comprising:

a member of resilient material having top and bottom major surfaces and including opposed end faces, and a plurality of at least first channels defined into said top surface and extending between said opposed end faces, each of said first channels having at least a depth and width equivalent to the diameter of a single-fiber splice coupling and having a first constriction at an entrance thereto along said top surface of less width than said diameter.

2. A splice holder as set forth in claim 1 wherein each said first channel has depth equivalent to twice the diameter of a single-fiber splice coupling, and having a second constriction defined along sides of said channel midway from said entrance toward a bottom thereof, defining upper and lower channel portions each generally shaped and dimensioned to receive and hold thereinto and therealong a respective said single-fiber splice coupling.

3. A splice holder as set forth in claim 2 wherein said member includes at least one second channel defined into said top surface and extending between said opposed end faces, each said second channel having a depth and width equivalent to the diameter of a multi-fiber fusion splice coupling, for receipt thereinto and holding of a mass fusion splice coupling.

4. The splice holder as set forth in claim 1 wherein said resilient material is an elastomer.

5. The splice holder as set forth in claim 4 wherein said elastomeric material a polypropylene based elastomer.

6. The splice holder as set forth in claim 1 wherein said member includes spaced from each said opposed end thereof, a strain relief portion having a plurality of slots into said top surface aligned with said first and second channels for receiving thereinto said single fibers and said ribbon cables extending from said single-fiber splice couplings and said multi-fiber fusion splice couplings, respectively.

7. A fiber optic splice tray, comprising:

a tray member including a bottom wall, opposed side walls and opposed end walls; and a splice holder for holding splice couplings of fiber optic members and secured to said bottom wall between said opposed end walls and said opposed side walls, comprising:

a member of resilient material having top and bottom major surfaces and including opposed end faces, and a plurality of at least first channels defined into said top surface and extending between said opposed end faces, each of said first channels having at least a depth and width equivalent to the diameter of a single-fiber splice coupling and having a first constriction at an entrance thereto along said top surface of less width than said diameter.

8. A fiber optic splice tray as set forth in claim 7 wherein each said first channel has depth equivalent to twice the diameter of a single-fiber splice coupling, and having a second constriction defined along sides of said channel midway from said entrance toward a bottom thereof, defining upper and lower channel portions each generally shaped and dimensioned to receive and hold thereinto and therealong a respective said single-fiber splice coupling.

9. A fiber optic splice tray as set forth in claim 8 wherein said member includes at least one second channel defined into said top surface and extending between said opposed end faces, each said second channel having a depth and width equivalent to the diameter of a mass fusion splice coupling, for receipt thereinto and holding of a multi-fiber fusion splice coupling.

10. A fiber optic splice tray as set forth in claim 7 wherein said resilient material is an elastomer.

11. A fiber optic splice tray as set forth in claim 10 wherein said elastomeric material is a polypropylene based elastomer.

12. A fiber optic splice tray as set forth in claim 7 wherein said member includes spaced from each said opposed end thereof, a strain relief portion having a plurality of slots into said top surface aligned with said first and second channels for receiving thereinto said single fibers and said ribbon cables extending from said single-fiber splice couplings and said multi-fiber fusion splice couplings, respectively.

\* \* \* \* \*